May 9, 1967 W. GERNERT 3,319,066

ADJUSTABLE WIDE RANGE RADIATION LEVEL ALARM

Filed Oct. 29, 1964 2 Sheets-Sheet 1

INVENTOR.
WILLIAM GERNERT

BY

Roland A. Anderson
Attorney

ADJUSTABLE WIDE RANGE RADIATION LEVEL ALARM

Filed Oct. 29, 1964 2 Sheets-Sheet 2

INVENTOR.
WILLIAM GERNERT
BY
Roland A. Anderson
Attorney

United States Patent Office 3,319,066

Patented May 9, 1967

1

3,319,066

ADJUSTABLE WIDE RANGE RADIATION LEVEL ALARM

William Gernert, Pittsburgh, Pa., assignor, by mesne assignments, to the United States of America as represented by the United States Atomic Energy Commission Filed Oct. 29, 1964, Ser. No. 407,602
2 Claims. (Cl. 250—83.6)

ABSTRACT OF THE DISCLOSURE

A radiation dosimeter, adjustable over a wide range of radiation levels, includes means to compare the output of an ion-chamber with the output of a pulser which recharges the ion-chamber whenever the detected dosage is less than a set amount during the interval between pulses, causing an alarm to sound.

This disclosure relates to radiation level indicator circuitry and more particularly to a single device which can monitor radiation over long periods of time and operate an alarm if the radiation level during any short period of time therein exceeds a predetermined level and in which the predetermined level is easily adjustable over a wide range.

The measuring and detection of radiation is well known. These devices may include a gas containing ion chamber including a cylindrical cathode electrode and an axial anode electrode in which the electrodes are charged. Radiation which enters the chamber ionizes the gas to form ion-pairs and electrons which are attracted to the electrodes. The voltage on the electrodes is selected for specific types of operation. If only a low voltage is used, the output pulse from the anode electrode is related to the energy of the received radiation whereas with the use of higher voltages such as in the Geiger Mueller tube the detected output at the anode electrode is the same for received radiation of various different energy levels. In addition to the use of various voltages on such devices, the electrical capacity of such devices also differ. Such detectors have an inherent electrical capacity and an inherent or external resistance which normally results in their eventual discharge. The receipt of radiation and the resulting ionization events increase this rate of discharge. The normal discharge time of such devices should be sufficiently large so as to allow the ions created therein to migrate to the collecting anode electrode.

A dosimeter is a device which indicates the accumulated affect of radiation of various energy levels over a certain time period. An ion chamber having a low voltage and long time constant thus acts as a dosimeter.

Some prior devices have the disadvantages that they require manual supervision for recording their readings and manual resetting while still others are capable of working only in limited levels of radiation.

Accordingly, it is an object of this invention to provide improved radiation detector circuitry which can automatically and continually monitor a source of radiation for long time periods and automatically operate an alarm only when a predetermined radiation level has been exceeded within a short time period therein.

Another object is to provide improved radiation dosimeter circuitry which is adjustable over a wide range of radiation levels.

In accordance with one aspect of the invention a comparison is made between the voltage output of a dosimeter type ion chamber with the voltage output from a pulser for periodically recharging the ion chamber whenever the dosage detected during the time interval between successive pulses from the pulser is less than a predetermined amount and in which an alarm is sounded when the dosage exceeds said amount.

2

A further aspect of the invention provides that the pulser continually generates spaced pulses and that the repetition rate of said pulses may be varied for providing a variable radiation level alarm.

The above-mentioned and other objects and advantages of this disclosure will be obvious to those skilled in the art upon reading the following detailed description in which.

Figure 1:
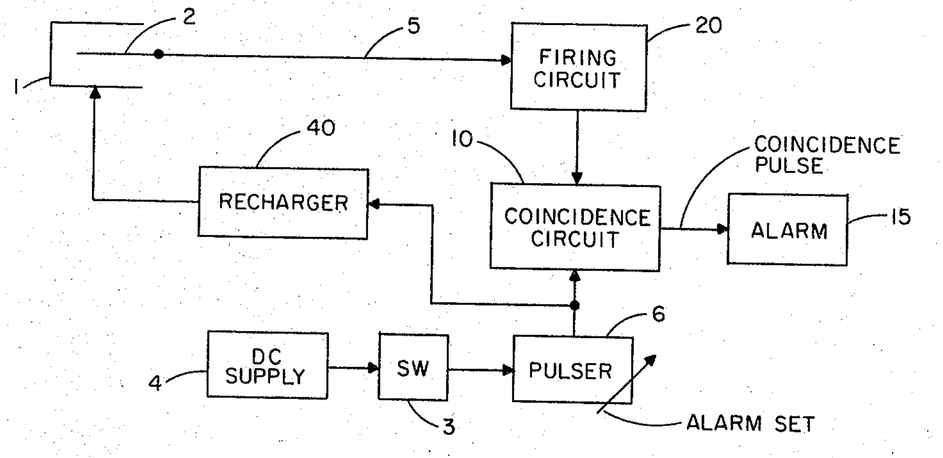
FIG. 1 is a block diagram of the invention.

In FIG. 1 an ionization chamber has a cylindrical cathode 1 and a coaxial wire anode 2. Closing of switch 3 charges the ion chamber by applying a positive low voltage source 4 to cathode 1; anode 2 assumes a negative charge. The ion chamber in this invention has a large time constant, of the order of 1000 seconds for example, so that it retains its charge in the absence of radiation and acts as a dosimeter in the presence of radiation.

Figure 2:
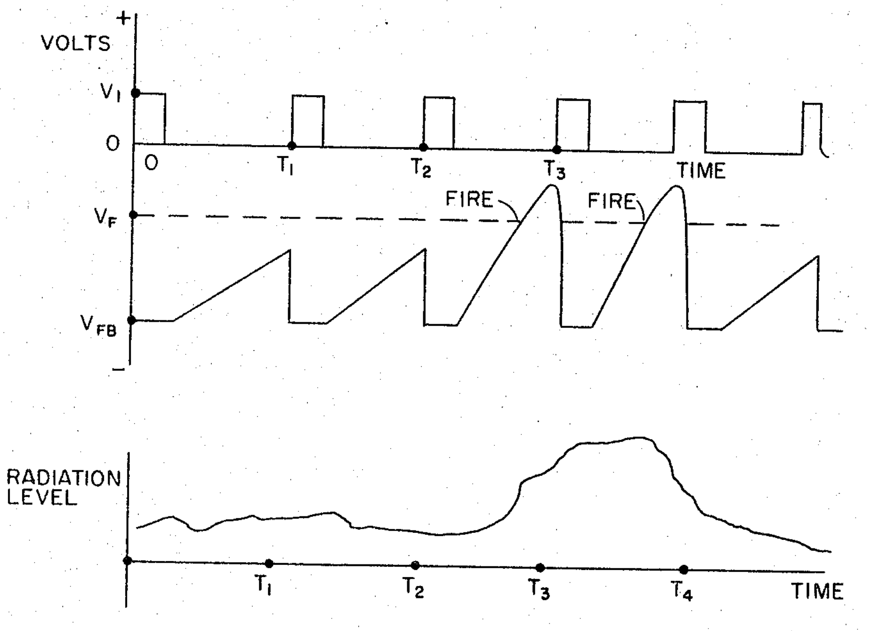
FIG. 2 is a graphy explaining the operation.

With the dosimeter type ion chamber charged, the chamber discharges slowly as a function of its time constant. Upon receipt of radiation, this discharge is accelerated at a rate dependent upon the detected radiation. Thus, the anode voltage on line 5 is originally charged negative $V_{FB}$ as shown in FIG. 2 and then increases in a positive direction in proportion to the received dosage; this voltage forms the bias for firing circuit 20. The closing of switch 3 applies voltage to the pulser 6 which controls recharger 40 to charge the ion chamber to voltage $V_{FB}$ initiating circuit operation with the ion chamber charged and the pulser producing periodic pulses at $t_0$, $t_1$, $t_2$, $t_3$, etc., as shown in FIG. 2. The ionization chamber will then begin to discharge at a very slow fixed rate determined by its time constant; the detection of radiation at a given level ionizes the gas within the chamber and increases the rate of discharge in proportion to the radiation level.

Figure 3:
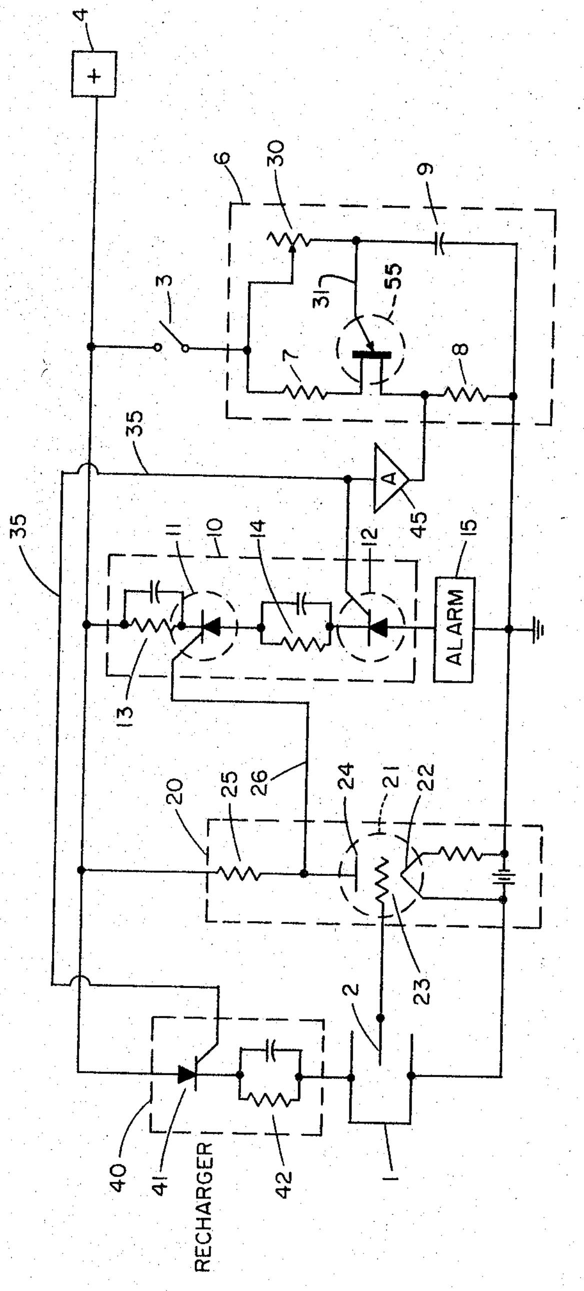
FIG. 3 is a schematic of the preferred embodiment of the invention.

An alarm set point is provided at pulser 6 as discussed in FIG. 3. If the ionization chamber is being used in a radiation level above the alarm set point, the charge on the ion chamber will leak off and approach the firing potential $V_F$ of circuit 20 more rapidly. In such a situation the coincidence circuit 10 concurrently receives a pulse from both the pulser 6 and firing circuit 20, thereby directing the coincidence circuit to signal operation of alarm 15 which indicates a radiation level above the set point. In the absence of coincidence, the ion chamber is recharged at 40 by the occurrence of a subsequent pulse from 6. Thus pulser 6 periodically recharges the ion chamber and the alarm is sounded only if the radiation level is sufficiently high that the ion chamber will discharge to voltage $V_F$ prior to the occurrence of subsequent recharging pulse from pulser. The alarm set point is changed by adjusting the frequency of pulser 6. The adjustment of the pulser to a low frequency allows the ionization chamber to discharge a larger charge for a given radiation level than the use of a higher frequency. This result occurs since the pulser recharges the chamber and the chamber is allowed to discharge only between pulses. As long as the ionization chamber is in a radiation field higher than the set point the firing circuit is energized and the alarm is actuated at the pulser frequency. The alarm 15 can be deenergized by either opening the switch 3 or removing the ionization chamber from the radiation field.

FIG. 2 is a graph showing the relative relationship of the ion chamber voltage and pulses to explain the operon of the alarm. The pulser 6 generates periodic posi-e pulses of amplitude $V_1$ at equal spaced time periods $t_1$, $t_2$, etc. Adjustment of the alarm set varies the spac-; of the pulses to a different frequency. The negative ltage $V_F$ is shown to indicate the firing point of the firing cuit 20. The negative voltage $V_{F_B}$ shows the normal gative charge on the ion chamber. The bias of the firing cuit is controlled by the charge on the anode of the iization chamber; accordingly, the anode potential leaks in a positive direction at a rate determined by the ceived radiation. The firing circuit bias increases in a sitive direction. If and when this potential reaches $V_F$, e circuit 20 will operate. In the illustrated example of G. 2 from time zero to $t_1$ and from $t_1$ to $t_2$ the received diation is at a low level and the ion chamber discharge rve never reaches the firing point $V_F$ because the arrival pulses at $t_1$ and $t_2$ recharges the chamber back to $V_{F_B}$. the example of FIG. 2 an increased radiation level is ceived during the time period from $t_2$ to $t_3$ so that the n chamber discharges rapidly and the firing circuit bias creases rapidly and crosses the firing potential $V_F$ before e pulse at $t_3$ can recharge the chamber. Accordingly, ior to time $t_3$ the coincidence circuit 10 will receive incident pulses from both 20 and 6 to thereby operate arm 15.

From the above operation, it should be clear that the arm operation requires a particular relationship between e amount of detected radiation dosage as indicated by e firing circuit bias and the subsequent occurrence of a ilse from pulser 6. Variation of the repetition rate of e pulser by adjustment of alarm set therefore varies the diation level at which an alarm is given since as the fre-iency of pulses is increased a larger dosage is required discharge the ion chamber to the firing potential prior the arrival of a subsequent pulse recharging the iamber.

FIG. 3 is the preferred embodiment of the invention iown in schematic form with the common elements of IG. 1 having the same numerals.

FIG. 3 shows the ion chamber cathode 1 and anode 2, ie starter switch 3, the voltage supply 4, the pulser 6, oincidence circuit 10, alarm 15, firing circuit 20, and echarger 40.

The firing circuit 20 includes an electrometer tube 21 ith filament 22, grid 23, anode 24 and an anode resistor 5, connected to the positive D.C. supply voltage 4. The egative bias for amplifier 21 of the firing circuit is con-rolled by the negative charge between the anode 2 and athode 1 of the ion chamber as shown in FIG. 2. The utput of electrometer 21 is connected on line 26 to con-rol the silicon control rectifier 11 in coincidence circuit 0. The coincidence circuit 10 in addition to rectifier 11 lso includes another silicon control rectifier 12 both of vhich are connected in series through two R–C circuits 3 and 14 to alarm 15. In the absence of radiation above he present level, diodes 11 and 12 are non-conducting and larm 15 is deenergized.

The pulser 6 is a variable frequency relaxation type of oscillation and includes a unijunction or double base tran-sistor 55, resistors 7 and 8, condenser 9 and potentiometer 30. In normal operation, after switch 3 is closed, con-denser 9 recharges through potentiometer 30 from ground o source 4; the emitter 31 is normally nonconducting. Resistors 7 and 8 permit current flow through the base of transistor 55 so a preset back bias exists at the junc-tion of the emitter-base. As the voltage across condenser 9 reaches a value greater than the preset back-bias, the emitter conducts to discharge condenser 9 through resistor 8, and provide a positive pulse on line 35. Subsequently the condenser again charges and again discharges. The repetition rate of the pulser is determined by the R–C time constant of condenser 9 and the setting of the potenti-ometer 30 and the time period between pulses is the time required for the condenser 9 to rise in voltage to the preset back-bias at the emitter-base junction.

A recharging circuit 40 includes a silicon control recti-fier 41 and a parallel resistor-condenser circuit 42.

In the operation of FIG. 3, switch 3 is closed to con-nect a constant supply voltage 4 to the pulser 6 to thereby initiate the charging of condenser 9 and the subsequent discharge of the condenser through resistor 8 thereby produces a negative pulse on line 35 at the output of inverter 45. The negative pulses on line 35 breaks down charging control rectifier 41 to connect source 4 to the cathode 1 of the ion chamber for recharging to $V_{F_B}$. When the pulse on line 35 is terminated the voltage on the capacitor in resistor-condenser circuit 42 terminates con-duction of rectifier 41 and the ion chamber has been recharged.

The ion chamber is then permitted to discharge from $V_{F_A}$ toward $V_F$ rate determined by the amount of radiation received.

If the radiation level received is below the alarm set point, the charge on the dosimeter will approach the firing voltage $V_F$ of the firing circuit in a manner as shown the time periods from 0 to $t_2$ in FIG. 2. However, at the particular set point of the pulser at $t_1$ and $t_2$ for example a positive pulse will appear on line 35 from the pulser before the ion charge on anode 2 reaches the firing level of amplifier 21. Thus, the alarm is not operated since rectifier 11 is not fired even though the pulse on line 35 would permit rectifier 12 to fire. Simultaneously, the pulse on line 35 controls rectifier 41 to recharge the ion chamber.

Alternatively, if the ionization chamber is in a radia-tion level above the alarm set point, the charge on the ion chamber will leak off and approach the firing point more rapidly and actually fire circuit 20 prior to the subsequent pulse on line 35. Under these circumstances, the coin-cidence circuit now receives a pulse from both the pulser on liner 35 and the firing circuit on line 26 to fire both rec-tifiers 11 and 12 and thus operate alarm 15.

The alarm will continue to receive pulses and operate at the pulser frequency as long as the ionization cham-ber is in a radiation field higher than the set point. The alarm can be deenergized by either opening the switch or removing the ion chamber from the radiation field. By adjusting the frequency of the pulser, the period of time between recharging of the ion chamber will be increased or decreased. If the period between pulses is decreased a higher level of radiation is necessary to operate the alarm because a higher level of radiation will be required to dis-charge the ion chamber to voltage $V_F$ before the next re-charging pulse. Similarly if the period between pulse is decreased the alarm may be operated at a lower level of radiation intensity because the ion chamber has a longer time to discharge prior to being recharged. Thus, since the frequency of the pulses is easily controlled over a wide frequency range, the present invention is capable of op-erating an alarm when the radiation level exceeds any of a wide range of preset levels.

Having thus desrcibed a preferred embodiment of my invention as required, it will be obvious that there are equivalents for various component parts. Accordingly, the scope of my invention is defined in the following claims.

I claim:

1. Apparatus for measuring radiation levels over wide ranges comprising an ion chamber of the dosimeter type in which the receipt of radiation causes a flow of current proportional to the intensity of radiation and a discharge of the chamber, an electrometer tube for measuring the charge on said ion chamber and for producing an output pulse when the chamber has discharged to a predeter-mined level, a resistance-capacitance relaxation type pulse generator having means for varying the frequency of the generator over a wide range, alarm means, a pair of nor-mally non-conducting control rectifiers connected in series with said alarm across a source of voltage, means for connecting the output from said pulse generator for both charging said ion chamber and firing one of said rectifiers upon the occurrence of each pulse from the generator, means for firing the other one of said control rectifiers upon the occurrence of the output pulse from the electrometer whereby the alarm is operated only when the radiation level occuring during the time between pulses from the generator exceeds a preset level determined by the frequency of the generator.

2. Apparatus for indicating radiation levels comprising an ion-chamber for detecting radiation, an adjustable frequency pulse generator, means for periodically automatically charging said ion-chamber in synchronism with and at the frequency of said generator means for measuring the charge on said ion-chamber and for producing an output pulse when the charge is less than a predetermined amount, indicating means, and coincidence detection means for operating said indicating means in response to the coincidence of said output pulse and a pulse from said pulse generator whereby any particular radiation level will operate said indicating means only when the frequency of said pulse generator is suffiicently low that said output pulse may occur during the period between pulses from said pulse generator, said coincidence detection means includes a pair of silicon control rectifiers connected in series with said indicating means in which one of said diodes is controlled by said pulse generator and the other diode is controlled by said output pulse.

References Cited by the Examiner

UNITED STATES PATENTS

| | | | |
|---|---|---|---|
| 2,653,248 | 9/1953 | Perlow et al. | 250—83.6 X |
| 2,672,561 | 3/1954 | Lichtman | 250—83.6 |
| 3,214,588 | 10/1965 | Cooke-Yarborough | 250—83.6 |

ARCHIE R. BORCHELT, *Primary Examiner.*